United States Patent [19]

Stoffelsma

[11] Patent Number: 4,495,128
[45] Date of Patent: Jan. 22, 1985

[54] METHOD FOR COLORING POLYVINYLCHLORIDE

[75] Inventor: Jan U. Stoffelsma, Hardenberg, Netherlands

[73] Assignee: Wavin B.V., Zwolle, Netherlands

[21] Appl. No.: 159,749

[22] Filed: Jun. 16, 1980

[30] Foreign Application Priority Data

Jun. 14, 1979 [NL] Netherlands .................... 7904675

[51] Int. Cl.$^3$ ................................ D01F 1/02
[52] U.S. Cl. .................. 264/211; 264/328.18; 264/331.15; 264/349
[58] Field of Search ........... 260/23 XA, 42.57, 42.49, 260/23 H; 264/211, 328.18, 300, 331.15, 349

[56] References Cited

U.S. PATENT DOCUMENTS

| | | | |
|---|---|---|---|
| 2,660,752 | 1/1954 | Grummitt et al. | 260/23 XA |
| 2,734,881 | 2/1956 | Lally et al. | 260/23 XA |
| 3,778,288 | 12/1973 | Ridge et al. | 106/308 Q |
| 3,929,712 | 12/1975 | Hiyama et al. | 264/300 |
| 4,012,348 | 3/1977 | Chelland et al. | 260/42.57 |
| 4,072,790 | 2/1978 | Creekmore et al. | 260/23 XA |
| 4,098,752 | 7/1978 | Ohkawa et al. | 260/42.57 |
| 4,116,908 | 9/1978 | Tzmeug | 260/42.57 |
| 4,274,987 | 6/1981 | Augustyn | 260/42.57 |
| 4,278,576 | 7/1981 | Goldman | 260/23 XA |
| 4,280,941 | 7/1981 | Datta et al. | 260/23 XA |
| 4,283,310 | 8/1981 | James et al. | 260/23 XA |
| 4,283,315 | 8/1981 | James et al. | 260/23 XA |

FOREIGN PATENT DOCUMENTS

| | | | |
|---|---|---|---|
| 48-13737 | 4/1973 | Japan | 264/211 |
| 1538718 | 3/1977 | United Kingdom . | |

Primary Examiner—Jay H. Woo
Assistant Examiner—Tinker R. McBrayer
Attorney, Agent, or Firm—Wilkinson, Mawhinney & Theibault

[57] ABSTRACT

Coloring composition for colouring polyvinylchloride comprising at least 40% by weight of coloring pigment and at most 60% by weight of glycerolmonostearate. The composition may be added directly to extruder for extruding polyvinylchloride, the amount of glycerolmonostearate in the moulded article as obtained being restricted to at most 5%.

1 Claim, No Drawings

METHOD FOR COLORING POLYVINYLCHLORIDE

BACKGROUND OF THE INVENTION

1. Field of the Invention

The present invention relates to a colouring composition for colouring polyvinylchloride. The term polyvinylchloride also includes copolymers of vinylchloride and otherwise modified polyvinylchloride.

For colouring polymers, colouring pigments are used on a large scale.

2. Description of the Prior Art

It is known e.g. in the art to manufacture by injection moulding plastics articles in various different colours, as required by the customers. Examples of such articles are pipe fittings, covers, boxes etc.

It is also known in the art to extrude thermoplastics pipes which have to meet different demands, with very particular colours, in order to avoid any risk of exchanging plastics pipes, to be used for a certain aim, with other pipes, which would be absolutely unsuitable for that aim. So, for instance, a plastics pipe for transporting water is given a colour differing from the colours used for pipes being employed for transport of gases.

Said colouring compositions present the disadvantage, that the great fineness of the colouring particles may be a nuisance, whilst furthermore, handling the empty packages of such colouring pigments requires much labour, so that transporting said empty packages and preventing the hindrance by fine dye particles, should be restricted to a minimum. It is not always possible to choose pigments without toxic character, so that there is always danger of contamination by handling such pigments.

Efforts have been made to obviate these disadvantages by providing the mixers, in which plastics are mixed with colouring pigments, with metering devices, metering the material on a volume- or on a weightbasis, thus allowing the use of containers with colouring pigments.

Metering devices allowing an accurate control of the quantity of colouring pigments to be dispensed are, however, extremely expensive; also measures have to be taken to avoid dusting.

Efforts have also been made to admix the colouring pigments with additives in the form of molten fatty acid amides and to cast the liquid composition into moulds, whereupon the moulded articles obtained after solidification may be used for forming a mixture with plastics, or to grind the moulded articles and to use the granulate particles as an additive for the thermoplastics to be coloured. The latter method is very inconvenient in that fatty acid amides melt at rather high temperatures, thus causing the risk of impairing the properties of organic colouring pigments. Moreover, the high melting points of the additives complicate proper dispersion of colouring pigments in the thermoplastics.

SUMMARY OF THE INVENTION

In view of the foregoing factors and conditions of the prior art it is a primary object of the present invention to provide a colouring composition of the aforementioned type, avoiding all the disadvantages mentioned hereinbefore and the risk of impairing colouring pigments during mixing as well as avoiding contamination of the plant.

This object is attained in accordance with the invention in that a colouring composition for colouring polyvinylchloride to be extruded or injection moulded, contains at least 40% by weight of colouring pigments and at most 60% by weight of a glycerolmonostearate.

A colouring composition of this type allows the colouring pigments to be admixed with the inexpensive glycerolmonostearate at much lower temperatures, so that the properties of the colouring pigments are not impaired due to high temperatures. Furthermore a monoglycerolstearate is a very good lubricating agent in polyvinylchloride so that according to the invention a lubricating agent is added to the plastics composition simultaneously with the colouring pigment. Moreover, glycerolmonostearate has strong surface active properties so that the colouring pigments are excellently coated by the glycerolmonostearate. At least glycerol monostearate is very compatible with other additives added to polyvinylchloride.

The aforementioned colouring composition may be added to the thermoplastics to be extruded, during the admixture, but also directly to the extruder. Of course, the composition is also well suited for adding same to polyvinylchloride compositions to be used for injection moulding.

It should be noted that the expression glycerolmonostearate does not only comprise pure glycerolmonostearate, but also impure glycerolmonostearate, containing different amounts of glyceroldi- and -tristearate, depending on the purity of the glycerolmonostearate. Typical values are: 40–50% monostearate, 40–43% distearate and 8–10% tristearate. It has been proved in actual practice, that an admixture of a colouring composition comprising glycerolmonostearate and a colouring pigment, in accordance with the invention, allows better results to be obtained than a separate admixture of the two substances of the colouring composition in accordance with the invention.

Very conveniently a colouring composition comprises 75% by weight of colouring pigments, the remaining percentage of said composition consisting of glycerolmonostearate, serving as a lubricating agent.

The invention also relates to a process of manufacturing polyvinylchloride articles comprising extrusion or injection moulding of polyvinylchloride mixed with a lubricating agent and a colouring pigment, wherein a particulate colouring composition is added to the polyvinylchloride, said composition containing at least 40% by weight of colouring pigments and at most 60% by weight of a glycerol monostearate.

Preferably, glycerolmonostearate is present in the polyvinylchloride in a total amount of at most 5% by weight.

The features of the present invention which are believed to be novel are set forth with particularity in the appended claims.

Other claims and many of the attendant advantages will be more readily appreciated as the same becomes better understood by reference to the following detailed examples.

DESCRIPTION OF PREFERRED EMBODIMENTS

EXAMPLE I 5,5 kg of molten glycerolmonostearate is admixed with 4,5 kg of cadmiumsulfide-yellow. After mixing the composition is solidified in moulds. The moulded compositions as obtained, which may be given a very accurate weight, may be supplied as such to the mixers for mixing same with polyvinylchloride.

The moulded articles as produced may also be crushed in order to obtain granulate particles, which are suitable for mixing with polyvinylchloride to be extruded by means of an extruder.

EXAMPLE II

A colouring composition according to the present invention is prepared by mixing 50 kg glycerolmonostearate with 50 kg phtalocyanine-green, whereupon the molten mixture is solidified in moulds and the moulded articles are crushed so that granulate particles are obtained. Said granulate particles may be appropriately mixed with polyvinylchloride in the mixers.

In this manner green coloured polyvinylchloride pipes are obtained, the colouring properties and composition of which are much better than those of pigment particles and lubricating agents being separately added.

EXAMPLE III 75 kg phtalocyanine-blue are mixed with 50 kg of molten glycerolmonostearate, whereupon said mixture is cast into a mould so that the moulded compositions are obtained having a specifically defined weight. The products as such are supplied directly to the extruder for extruding polyvinylchloride which contains normal additives. The glycerolmonostearate acts as a lubricating agent: the total amount of glycerolmonostearate in the extruded polyvinylchloride amounts to 3%.

EXAMPLE IV 50 kg of black iron oxide is mixed with 50 kg of molten glycerolmonostearate. After mixing the molten mixture is cast into a mould and the moulded compositions are crushed in order to obtain granulate particles. Adding these granulates to an extruder fed with polyvinylchloride, provides a very convenient colouring, whilst the coloured pipe presents optimum properties. In order to avoid exuding of the glycerolmonostearate it is in general recommended to restrict the total amount of glycerolmonostearate to 5% based on the polyvinylchloride.

EXAMPLE V 75 kg titanium dioxode is admixed with 25 kg molten glycerolmonostearate and the molten mixture is cast into a mould. In this manner shaped compositions are obtained which are added to an extruder fed with polyvinylchloride. The total amount of glycerolmonostearate in the extruded pipe is 4%.

EXAMPLE VI 75 kg of cadmium-yellow is mixed with 25 kg of molten glycerolmonostearate containing 40% of glyceroldistearate and 10% of glyceroltristearate.

After solidification and moulding of the composition the moulded composition is, after crushing, added to an injection moulding device fed with polyvinylchloride. The total amount of glycerolmonostearate in the finished pipefitting is 4% by weight. The respective pipe will be coloured very effectively, whilst said pipe will show very good properties.

EXAMPLE VII

Example VI is repeated, but now the colouring composition is added to polyvinylchloride to be extruded, which addition will take place while mixing said polyvinylchloride with other substances.

EXAMPLE VIII 75 kg of a brown colouring pigment are mixed with 25 kg of glycerolmonostearate. After solidification a moulded colouring composition is obtained which lends itself very appropriately for colouring polyvinylchloride.

What is claimed is:

1. A method of manufacturing colored injection molded or extruded poly(vinyl chloride) articles which comprises adding to the mold or extruder along with the poly(vinyl chloride) a coloring composition containing at least 40% by weight of coloring pigments and at most 60% by weight of glycerol monostearate, said coloring composition being obtained by mixing pigment particles with a molten mass of glycerol monostearate and solidifying the molten mass, said coloring composition being added in such an amount that the molded article contains a maximum of 5% by weight glycerol monostearate.

* * * * *